United States Patent
Horbelt

(10) Patent No.: US 7,451,026 B2
(45) Date of Patent: Nov. 11, 2008

(54) CONTROL UNIT FOR CONTROLLING AND/OR REGULATING AT LEAST ONE VEHICLE FUNCTION

(75) Inventor: Michael Horbelt, Warmbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/255,799

(22) Filed: Oct. 21, 2005

(65) Prior Publication Data

US 2006/0100759 A1    May 11, 2006

(30) Foreign Application Priority Data

Nov. 9, 2004    (DE) .................. 10 2004 054 016

(51) Int. Cl.
*G06F 7/00* (2006.01)
(52) U.S. Cl. .................. 701/36; 701/1; 710/110; 370/384; 375/238
(58) Field of Classification Search .................. 701/1, 701/36; 710/110; 370/384; 379/246; 368/155; 327/108; 438/612; 375/238
See application file for complete search history.

(56) References Cited

U.S. PATENT DOCUMENTS

| | | | | |
|---|---|---|---|---|
| 6,107,134 A * | 8/2000 | Lu et al. | ...................... | 438/239 |
| 6,218,934 B1 * | 4/2001 | Regan | ......................... | 340/438 |
| 7,203,776 B2 * | 4/2007 | Junger et al. | .................. | 710/57 |
| 2002/0019687 A1 * | 2/2002 | Suzuki et al. | ................. | 701/22 |
| 2004/0232864 A1 * | 11/2004 | Sunaga et al. | ............... | 318/434 |
| 2004/0232872 A1 * | 11/2004 | Sunaga et al. | ............... | 318/652 |
| 2005/0120320 A1 * | 6/2005 | Uozumi et al. | ................. | 716/7 |
| 2005/0154474 A1 * | 7/2005 | Kauntz et al. | ................. | 700/1 |
| 2005/0159869 A1 * | 7/2005 | Tohdo et al. | .................. | 701/48 |
| 2005/0164965 A1 * | 7/2005 | Reddy et al. | .................. | 514/44 |
| 2005/0231355 A1 * | 10/2005 | Hair et al. | .................... | 340/538 |
| 2005/0265344 A1 * | 12/2005 | Harris et al. | ................ | 370/392 |
| 2005/0267659 A1 * | 12/2005 | Sunaga et al. | ................. | 701/36 |
| 2006/0190155 A1 * | 8/2006 | Meyer et al. | .................. | 701/54 |
| 2006/0190648 A1 * | 8/2006 | Larisch et al. | .............. | 710/110 |
| 2006/0282549 A1 * | 12/2006 | Vinnemann | .................... | 710/3 |

\* cited by examiner

*Primary Examiner*—Khoi H. Tran
*Assistant Examiner*—Jorge O Peche
(74) *Attorney, Agent, or Firm*—Kenyon & Kenyon LLP

(57) ABSTRACT

A control unit for controlling and/or regulating at least one vehicle function, including at least one computing element and one transceiver for connecting the control unit to at least one data line of a data bus of a client-server network. Using at least one transmitted signal and at least one received signal, the at least one computing element determines if the transceiver is transmitting or receiving data via the at least one data line. In order to provide the option of being able to ascertain the transmitted and received signals without having to pick them off in the interior of the control unit and to direct them outwards, the control unit is connected to the data line via a measurement set-up, the measurement set-up having an arrangement for determining if a change in the state of a data signal applied to the data line originates at the control unit or at the rest of the client-server network.

11 Claims, 4 Drawing Sheets

CONTROL UNIT FOR CONTROLLING AND/OR REGULATING AT LEAST ONE VEHICLE FUNCTION

FIELD OF THE INVENTION

The present invention relates to a control unit for controlling and/or regulating at least one vehicle function. The control unit includes at least one computing element and one transceiver for connecting the control unit to at least one data line of a client-server network. Using at least one transmitted signal (Tx) and at least one received signal (Rx), the at least one computing element determines if the transceiver is transmitting or receiving data via the at least one data line of the client-server network.

The present invention also relates to a client-server network having at least one data line, to which at least one control unit for controlling and/or regulating at least one vehicle function is connected. At least one of the control units includes at least one computing element and one transceiver, via which the at least one computing element is connected to the at least one data line. Using at least one transmitted signal and at least one received signal, the at least one computing element determines if the transceiver is transmitting or receiving data via the at least one data line of the client-server network.

BACKGROUND INFORMATION

Control units, whose computing elements are connected, via a transceiver, to a client-server network taking the form of a field bus, are conventional. The computing element may take the form of a microprocessor or a microcontroller. A computing element in the form of a finite state machine (so-called state machine) is also possible.

The network may have any topology; for example, a ring, a star, a line, or a tree topology is possible. The following types of field buses are considered, for example, as a client-server network. ARINC-629 (rapid avionics bus of the company Arinc, used in the Boeing 777, for example); AS interface for connecting sensors and actuators; CAN bus, used mainly in the automotive branch; EIB (electrical installation bus), used chiefly in building installation; FlexRay bus, used mainly in the automotive branch for X-by-wire systems; I2C; Interbus, used in machine construction or plant construction in a special design for safety engineering; LIN (local interconnect network) bus, used in the automotive branch; LON; Modbus; MOST bus, used in the automotive multimedia area; Profibus, used in robots, in machine construction, in plant construction, or in process automation; and Sercos, used in robots, in machine construction, and in plant construction.

For example, conventional LIN transceivers connect a computing element taking the form of a microprocessor or microcontroller to the data line of an LIN bus. Transmitted signals (Tx) and received signals (Rx) are exchanged by the transceiver and the computing element, in order to determine if the transceiver should transmit data through the LIN bus or receive data from the LIN bus.

During the testing and application phase of a control unit, it may be particularly important to monitor the state of the transmitted signal and received signal. In this manner, the functional sequences in the control unit and on the LIN bus may be more effectively monitored and, if necessary, corrected. When a HI voltage level applied to the LIN bus changes into a LO voltage level, it may be important to find out the reason for the change to the LO voltage level during the testing and application phase. For example, a change may be triggered by a switching element (e.g. a transistor) in the transceiver, the switching element being triggered by transmitted signal (Tx) and "pulling down" the HI voltage level to ground. During the testing and application phase, it may be important to find out whether the change to the LO voltage level was triggered by a monitored control unit or by a different control unit connected to the LIN bus. This may be ascertained by correlating the signal level on the data line of the LIN bus and transmitted and received signals (Tx, Rx) of the monitored control unit or the other control units.

Conventionally, in order to have knowledge of the current transmitted and received signals, the transmitted and received signals can be directed out to test terminals on the outside of the control-unit housing, where they can then be picked off and subsequently processed. However, this is only possible in control units in which the computing element and the transceiver are formed on separate chips, which means that the transmitted and received signals must be transmitted by lines between the two components, at which they can be easily picked off and directed outside. Even when the transceiver and the computing element take the form of separate components, this manner of rendering the transmitted and received signals accessible is relatively complicated and expensive. In addition, different control units must be provided with test terminals for transmitted and received signals (Tx, Rx) for the testing and application phase, and the different control units must not have such terminals for production applications.

In the past, there has been a tendency towards large-scale integrated semiconductors, which also had effects on the design and the manufacture of the computing-element/transceiver units in the control units. Thus, conventionally, for example, the computing element and the transceiver can be formed on a common, large-scale integrated chip, in which case instead of an expensive microcontroller, e.g., the computing element may take the form of a more simple and cost-effective finite-state machine (a so-called state machine). In the case of such large-scale integrated computing-element/transceiver units, transmitted signals (Tx) and received signals (Rx) travel in the interior of the chip and may no longer be picked off and directed to the outside of the control-unit housing, or may only be picked off and directed to the outside of the control-unit housing with a high degree of expenditure.

SUMMARY

An object of the present invention is to provide an option for being able to simply, safely and reliably ascertain (detect) transmitted and received signals (Tx, Rx) applied between a transceiver and a computing element of a motor-vehicle control unit, without the transmitted and received signals having to be picked off in the interior of the control unit and directed to the outside.

To achieve this object, it is provided, using the control unit of the type mentioned at the outset as a starting point, that the control unit be connected to the at least one data line of the client-server network via at least one measurement set-up; the measurement set-up having means for detecting if a change in the state of a data signal applied to the at least one data line originates at the control unit or at the client-server network.

Thus, the present invention does not provide for transmitted and received signals (Tx, Rx) to be directly determined. Rather, with the aid of the measurement set-up, it is simply determined what caused a change in the voltage level on the data line (for example, a data bus) of the client-server network, a monitored control unit or another control unit connected to the client-server network. To this end, e.g., the side of the measurement set-up on which the change in the signal level first occurs, i.e., the side of the monitored control unit or the side of the rest of the client-server network, is simply ascertained. Using this information, transmitted and received signals (Tx, Rx) for the monitored control unit may then be determined in view of the current signal level on the at least one data line of the client-server network.

According to an advantageous refinement of the present invention, it is provided that the at least one transmitted signal (Tx) and the at least one received signal (Rx) are not directed outside to terminals of the control unit. The advantages of the present invention are particularly realized in control units designed in this manner.

A preferred example embodiment of the present invention provides that the client-server network include exactly one data line. Such client-server networks are also referred to as single-line buses. The client-server network preferably includes a field bus. It is provided that the client-server network take the form of a LIN (local interconnect network).

In addition, it is provided that the computing element be a microcontroller. As an alternative, the computing element may also take the form of a finite-state machine.

The present invention has the indicated advantages when, in particular, the computing element and the transceiver are formed on a common, large-scale integrated semiconductor chip, for transmitted and received signals (Tx, Rx) are then not directed outwards out of the control-unit housing at all, or only with a high degree of complexity and high costs. In this case, the present invention still allows transmitted and received signals (Tx, Rx) to be determined and to be subsequently processed, in particular during the testing and application phase.

Another preferred refinement of the present invention provides for the detection arrangement to have two resistor elements connected in series, of which the one resistor element is connected to the transceiver of the control unit and the other resistor element is connected to the data line of the rest of the client-server network. A reference signal is applied between the two resistor elements. This may be drawn from the voltage of a vehicle battery. The detection arrangement has an arrangement for measuring a voltage drop across each resistor element. Based on the measured voltages, it is determined if a change in the state of the data signal applied to the at least one data line originates at the monitored control unit or at the rest of the client-server network. The measurement set-up preferably includes an arrangement for comparing the two measured voltages to each other, as well. On the basis of the result of the comparison, it is then determined if a change in the state of the data signal applied to the at least one data line originates at the control unit or at the client-server network.

It is possible for the measured voltages to be directed to the outside of the measurement set-up via suitable terminals and picked off there. Further processing of the voltages up to the point of determining the values of transmitted and received signals (Tx, Rx) is then accomplished outside of the measurement set-up.

However, it is also possible for at least partial further processing of the voltages to already be carried out in the measurement set-up itself. Thus, e.g., the two measured voltages may be compared by comparative devices, which may include an operational amplifier. As an alternative for comparing the two voltages, a differentiator may also be used to calculate the difference of the voltages. Based on the curve of the differential signal, it may then be determined if a change in the signal level on the at least one data line of the client-server network originates at the monitored control unit or at the rest of the network. In this case, a reference signal and a differential signal may be directed to the outside of the measurement set-up via suitable terminals and picked off there. Further processing of the reference and differential signals up to the point of determining the values of transmitted and received signals (Tx, Rx) is then accomplished outside of the measurement set-up.

Finally, it is also possible for the entire further processing of the measured voltages to take place in the measurement set-up itself. For this purpose, a logic circuit may also be provided in the measurement set-up in addition to the comparative devices and/or the differentiator, the logic circuit determining the current signal level of the transmitted signal and/or the received signal on the basis of the output signals of the comparative devices or the differentiator, and in view of the voltage level on the at least one data line of the client-server network. Of course, the comparative devices or the differentiator may be an integral part of the logic circuit. In this case, ascertained, transmitted signal (Tx) and/or ascertained, received signal (Rx) may be directed to the outside of the measurement set-up via suitable terminals and picked off there. Accordingly, it is provided that the measurement set-up include a logic circuit, which ascertains the at least one transmitted signal (Tx) and the at least one received signal (Rx) of the control unit on the basis of the information as to whether a change in the state of the data signal applied to the at least one data line originates at the control unit or at the client-server network, and on the basis of the current state of the data signal on the data line.

BRIEF DESCRIPTION OF THE DRAWINGS

Preferred exemplary embodiments of the present invention are explained in detail below, with reference to the figures.

DETAILED DESCRIPTION OF EXAMPLE EMBODIMENTS

Figure 2:
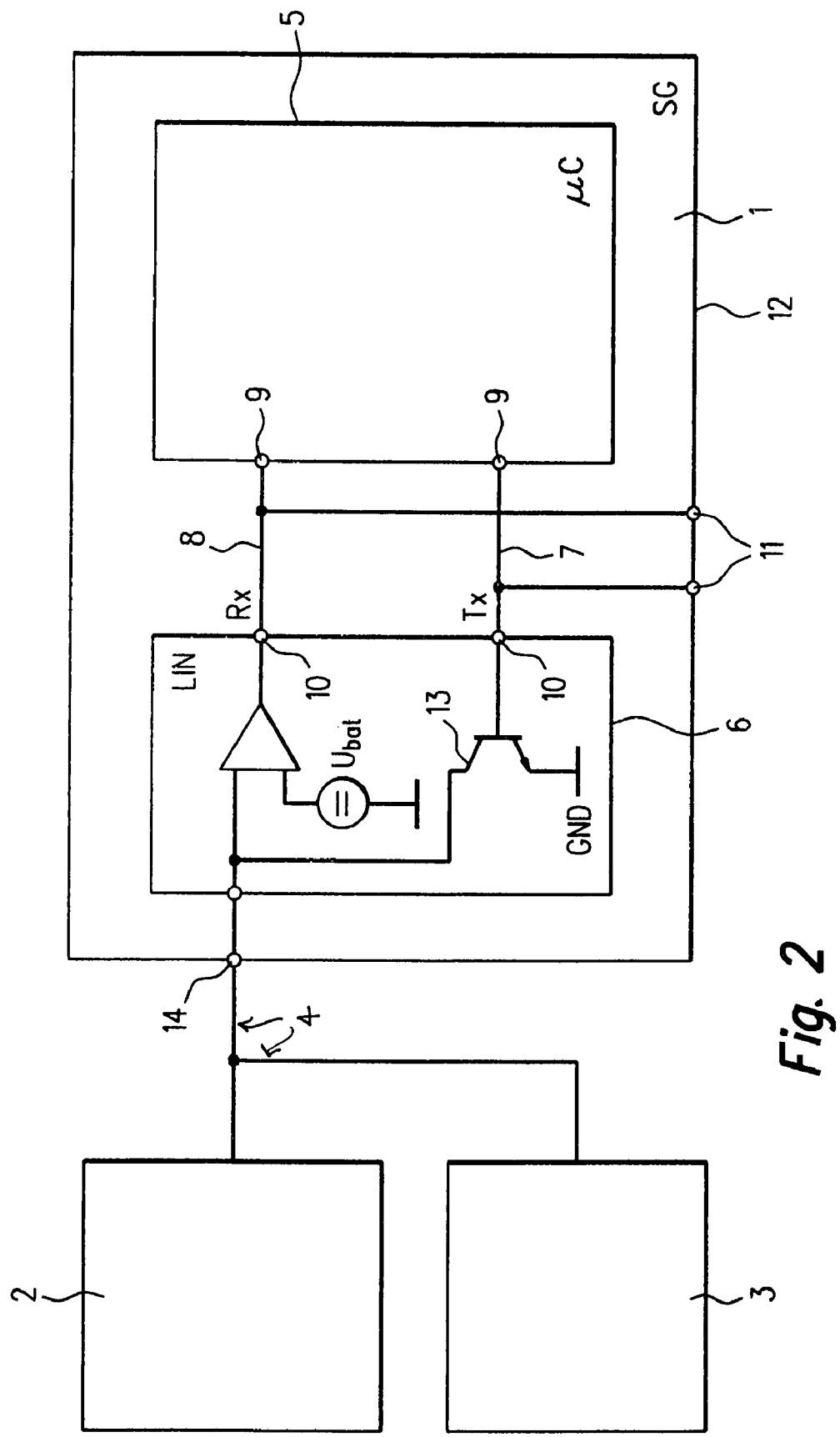
FIG. 2 shows a conventional client-server network.

A conventional client-server system is shown in FIG. 2. The illustrated client-server system takes the form of a field-bus system, in particular a LIN (local interconnect network). A LIN bus is especially used in the automotive sector for exchanging data between several motor-vehicle components. The LIN bus is a field bus having only one data line. It represents an inexpensive alternative to multiline data buses having greater functionality, such as CAN (controller area network) or FlexRay. The LIN bus is used, for example, in order to transmit measuring signals of sensors to a control unit or to transmit control signals from a control unit with to actuators.

The LIN-bus system illustratively shown in FIG. 2 includes a control unit 1, a sensor 2, and an actuator 3, which are connected to each other by a LIN bus 4. Control unit 1 includes a computing element 5 that takes the form of a microprocessor. In addition, control unit 1 has a transceiver 6, which is also referred to as a LIN transceiver. LIN transceiver 6 is used as an interface between microcontroller 5 and LIN bus 4 for transmitting and receiving data via LIN bus 4. In order for LIN transceiver 6 to know if it should transmit data from microcontroller 5 via LIN bus 4, LIN transceiver 6 receives a transmitted signal Tx from microcontroller 5. If LIN transceiver 6 receives data from LIN bus 4 and transmits them to microcontroller 5 for further processing, microcontroller 5 obtains a received signal Rx from LIN transceiver 6. Microcontroller 5 and LIN transceiver 6 take the form of separate semiconductor chips. For this reason, transmitted signal Tx and received signal Rx are transmitted by data lines 7, 8 from terminals 9 of microcontroller 5 to terminals 10 of LIN transceiver 6.

In LIN transceiver 6, the signal level on the data line of LIN bus 4 is "pulled up" to a high level HI by pull-up resistors (not shown). The HI voltage level corresponds, for example, to voltage $U_{13}$ bat of a motor-vehicle battery, e.g., 12 volt or 24 volt. In this state, LIN transceiver 6 receives data from LIN bus 4. When LIN transceiver 6 should receive data via LIN bus 4, LIN transceiver 6 is activated by transmitted signal Tx. In other words, transmitted signal Tx triggers a semiconductor switch 13, which, e.g., takes the form of a transistor, which means that originally high signal level HI on the data line of LIN bus 4 is "pulled down" to a lower level LO, e.g., to ground GND. Data from microcontroller 5 are now transmitted by LIN transceiver 6 via LIN bus 4.

During the testing and application phase of control unit 1, it may be particularly important to monitor the state of transmitted and received signals Tx, Rx. In this manner, the functional sequences in control unit 1 and on LIN bus 4 may be more effectively monitored and, if necessary, corrected. In the case of a HI signal level on LIN bus 4, it is apparent that no transceiver of the LIN-bus system is actively operating; therefore, transceiver 6 of monitored control unit 1 is also not operating actively. When a HI voltage level on LIN bus 4 is "pulled down" to a LO voltage level, it may be important to find out the reason for the change to the LO voltage level, during the testing and application phase. Thus, e.g., it may be important to find out if the change to the LO voltage level was triggered by monitored control unit 1 or by another component 2, 3 connected to LIN bus 4 or by another control unit connected to it. This may be determined by correlating the signal level on the data line of LIN bus 4 and transmitted and received signals Tx, Rx of monitored control unit 1.

For this reason, the related art provides for transmitted and received signals Tx, Rx to be picked off and directed outside to terminals 11 of control unit 1. Terminals 11 are situated, for example, on the outside of a control-unit housing 12. They are conveniently accessible from the outside via terminals 11 and may be used for sequencing control and error debugging, especially during the testing and application phase.

However, it is complicated and expensive to direct transmitted and received signals Tx, Rx outside. In addition, there was a tendency towards large-scale integrated semiconductors in the past, which also affected the design and the manufacture of computing-element/transceiver unit 5, 6 in control units 1. Thus, conventionally, for example, computing element 5 and transceiver 6 can be formed on a common, large-scale integrated chip, in which case instead of an expensive microcontroller, e.g., computing element 5 may take the form of a simpler and less expensive finite-state machine. In such large-scale integrated computing-element/transceiver units 5, 6, transmitted signals Tx and received signals Rx travel in the interior of the chip and may no longer be picked off, or they may only be picked off with an enormous degree of expenditure.

Figure 1:
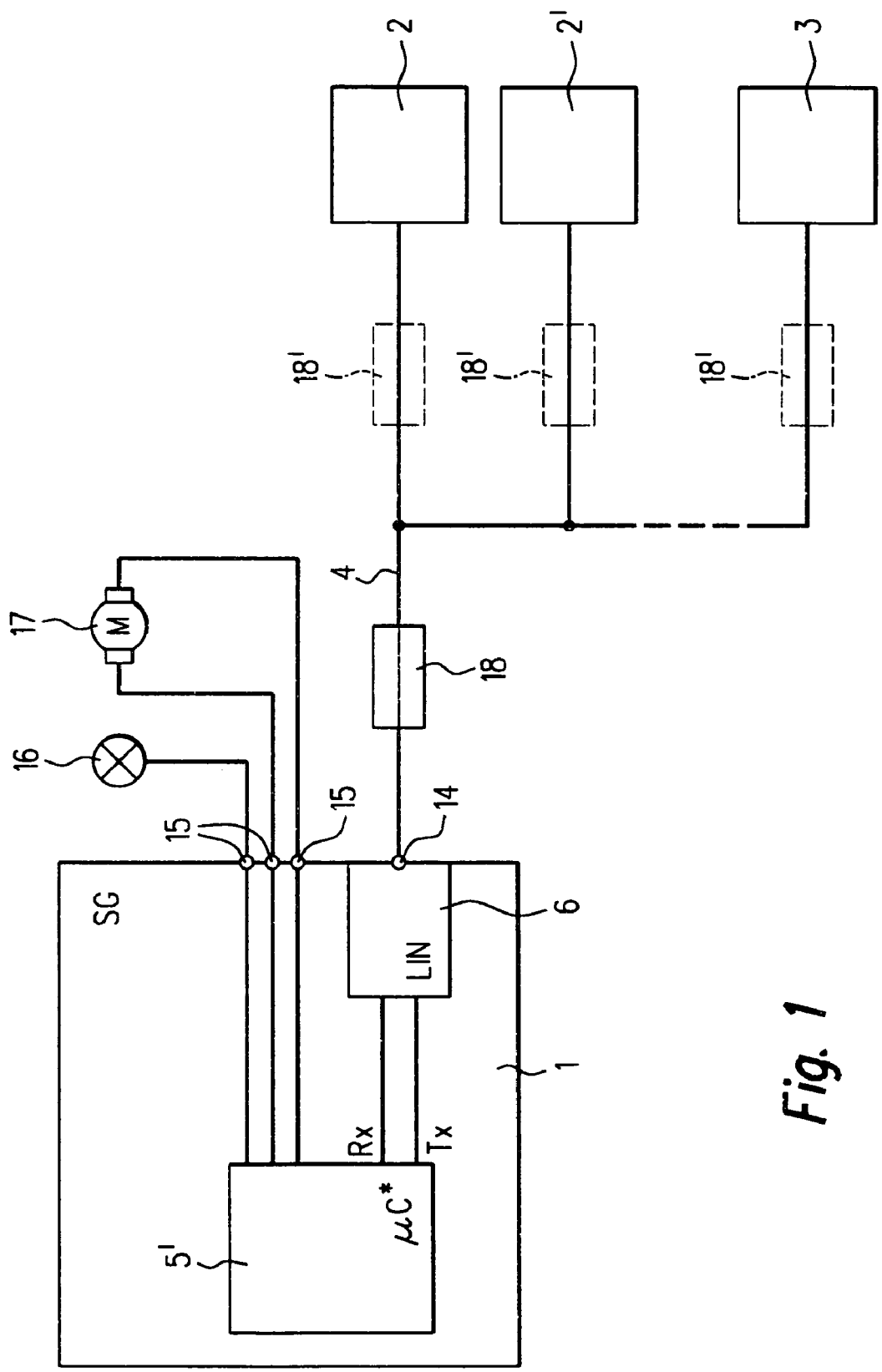
FIG. 1 shows a preferred example embodiment of the client-server network according to the present invention.

The present invention provides a remedy for this. A client-server network of the present invention is illustrated in FIG. 1. In the represented exemplary embodiment, the network takes the form of a field bus having only one date line, e.g., a LIN (local interconnect network). However, the network may also take any other form. For identical components, the same reference numerals are used in FIG. 1 as in FIG. 2. Transceiver/state-machine unit 5', 6 of control unit 1 from FIG. 1 has a terminal 14, to which the data line of LIN bus 4 is connected. In addition, state machine 5' of control unit 1 has further terminals 15 for controlling a lamp 16 or an electric motor 17.

One aspect of the present invention is to be seen in a measurement set-up 18, via which control unit 1 is connected to the data line of LIN bus 4. Measurement set-up 18 includes an arrangement for detecting if a change in the state or voltage level of a data signal applied to the data line originates at control unit 1 or at LIN bus 4, i.e., at one of the other components 2, 2', 3. Thus, the present invention does not provide for transmitted and received signals Tx, Rx to be directly determined. On the contrary, with the aid of measurement set-up 18, it is simply determined what caused a change in the voltage level on the data line of LIN bus 4, monitored control unit 1 or another control unit, which is connected to LIN bus 4 and is one of components 2, 2', 3. To this end, e.g., the side of measurement set-up 18, on which a change in the signal level first occurs, i.e., the side of monitored control unit 1 or the side of the rest of LIN bus 4, is simply ascertained. Using this information, transmitted and received signals Tx, Rx for monitored control unit 1 may then be determined in view of the current signal level on the data line of LIN bus 4.

Therefore, in accordance with the present invention, it may be discerned if monitored control unit 1 (e.g. a LIN node) actively connects to ground, or if LO is specified externally, both statically and dynamically. From this information, the values of transmitted and received signals Tx, Rx may be derived for monitored control unit 1. Consequently, the present invention provides the option of being able to ascertain transmitted and received signals Tx, Rx applied between a transceiver 6 and a computing element 5 of a control unit 1, without having to pick them off in the interior of control unit 1 and direct them outside.

It is possible for not only a control unit 1 to be connected to LIN bus 4 via a measurement set-up 18 of the present invention. Of course, control units from any other components 2, 2', 3 may also be connected to LIN bus 4 via corresponding measurement set-ups 18' (drawn in using a dashed line), so that transmitted and received signals Tx, Rx of the control units of these components 2, 2', 3 may also be ascertained in the manner of the present invention.

Many different options for implementing measurement set-up 18 of the present invention are possible. Some preferred specific embodiments are represented in FIGS. 3a through 3d. However, the present invention should by no means be limited to the represented embodiments.

Figure 3A:
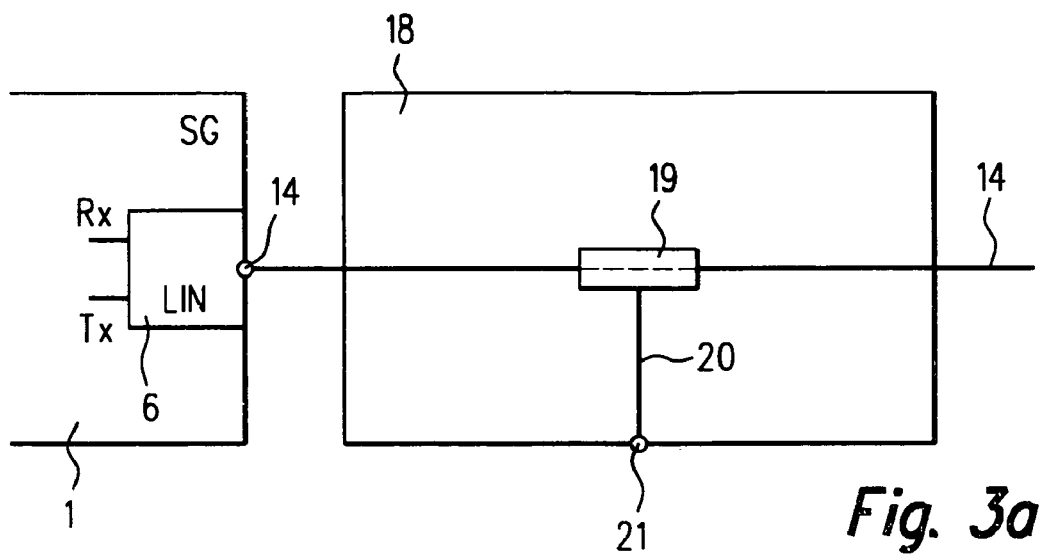
FIGS. 3a to 3d show various example embodiments of a measurement set-up according to the present invention.

Control unit 1 and LIN bus 4 are indicated in the exemplary embodiment represented in FIG. 3a. These are omitted in FIGS. 3b through 3d. In the exemplary embodiment from FIG. 3a, an arrangement 19 is provided in measurement set-up 18, the arrangement detecting the side of measurement set-up 18 on which a change in the signal level of the signal applied to the data line of LIN bus 4 first occurs. The side on which the change in the voltage level first occurs is determined to be the side on which the change originated. Therefore, when the change in the voltage level first occurs on the left side of measurement set-up 18 or detection arrangement 19, it is assumed that the change originated at monitored control unit 1. However, if the change in the voltage level initially occurs on the right side of measurement set-up 18 or detection arrangement 19, it is assumed that the change originated at LIN bus 4, i.e. at remaining components 2, 2', 3. This information regarding the side of measurement set-up 18, at which the change in the voltage level originates, is directed through a line 20 to a terminal 21, to the outside of measurement set-up 18. It may be picked off from there and subsequently processed.

The further processing includes, in particular, the ascertainment of transmitted signal Tx and received signal Rx of monitored control unit 1. Transmitted and received signals Tx, Rx are ascertained on the basis of the information as to the side at which the change in voltage level originated, in view of the current signal level on the data line of LIN bus 4.

Figure 3B:
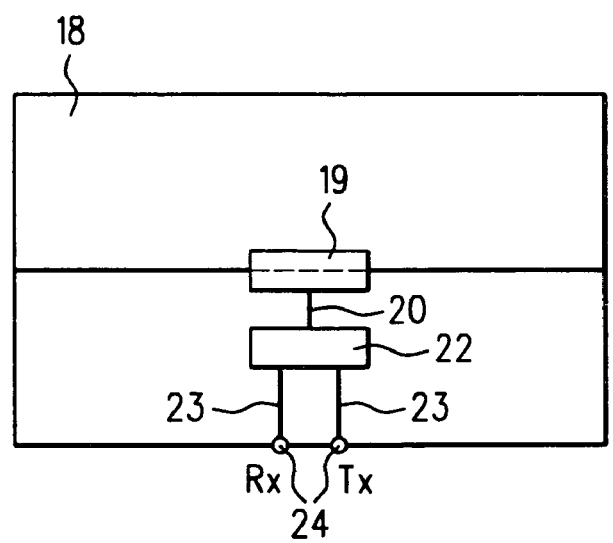

Represented in FIG. 3b is a further specific embodiment, where the information regarding the side, at which the change in voltage level originated, is directed through data line 20 to a logic circuit 22. In logic circuit 22, transmitted signal Tx and received signal Rx are ascertained on the basis of the obtained information, and in view of the current signal level on the data line of LIN bus 4. Ascertained, transmitted and received signals Tx, Rx are directed through data lines 23 to terminals 24, to the outside of measurement set-up 18. They may be picked off from there and subsequently processed.

Figure 3C:
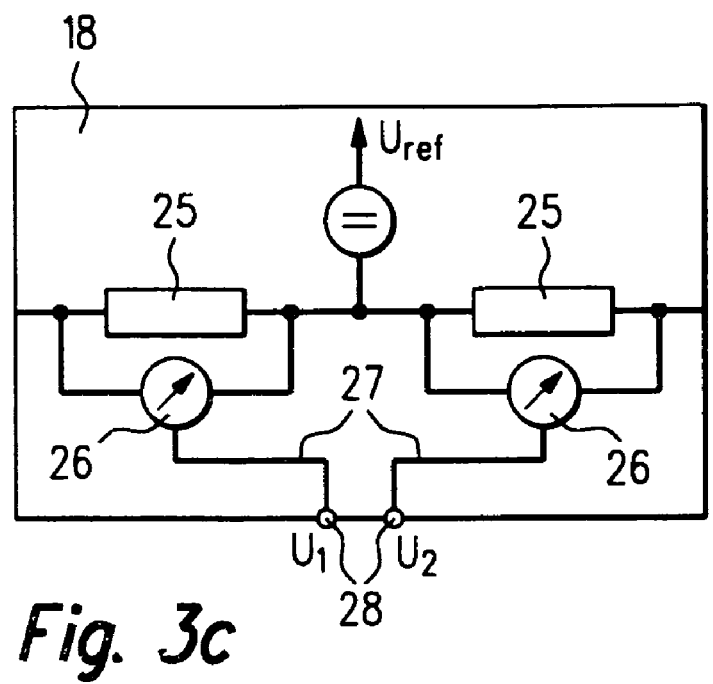

Shown in FIG. 3c is an exemplary embodiment, in which measurement set-up 18 or detection arrangement 19 has two resistor elements 25 connected in series, of which the one resistor element is connected to transceiver 6 of control unit 1 and the other resistor element is connected to the data line of the rest of LIN bus 4. A reference voltage U_ref is applied between the two resistor elements 25. Reference voltage U_ref is preferably a battery voltage of a vehicle battery and is, in particular, 12 volts or 24 volts. In addition, measurement set-up 18 and detection arrangement 19 have an arrangement 26 for measuring a voltage drop U_1, U_2 across each resistor element 25. Measured voltages U_1, U_2 are directed by data lines 27 to the outside of measurement set-up 18 via terminals 28. From there, they may be easily picked off and subsequently processed.

The further processing includes, for example, a comparison of measured voltages U_1, U_2, in order to obtain from this the information as to whether the change in the state of the data signal applied to the at least one data line of LIN bus 4 originates at control unit 1 or at LIN bus 4, i.e., at one or more of remaining components 2, 2', 3. This is accomplished, for example, with the aid of a comparator or a differentiator. In addition, the further processing includes the ascertainment of transmitted signal Tx and received signal Rx as a function of the acquired information, and in view of the current signal level on the data line of LIN bus 4. This is accomplished, for example, with the aid of a suitable logic circuit.

Figure 3D:
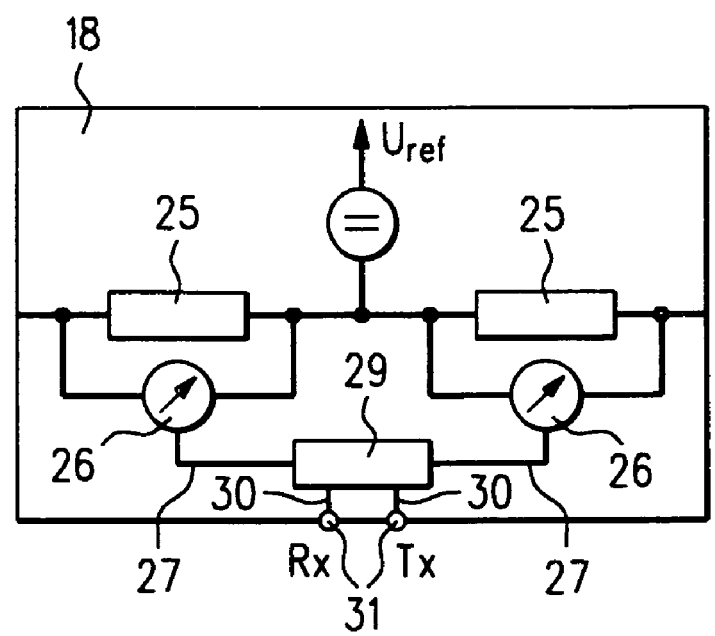

In the exemplary embodiment represented in FIG. 3c, the further processing of voltages U_1, U_2 up to the point of determining the values of transmitted and received signals Tx, Rx takes place outside of measurement set-up 18. In contrast, the exemplary embodiment from FIG. 3d provides a logic circuit 29, which includes the above-described comparator or differentiator, in order to obtain from measured voltages U_1, U_2 the information as to whether a change in the state of the data signal applied to the at least one data line of LIN bus 4 originated at control unit 1 or at LIN bus 4, i.e., at one or more of remaining components 2, 2', 3. In addition, logic circuit 29 is designed or programmed to ascertain transmitted signal Tx and received signal Rx as a function of the acquired information, and in view of the current signal level on the data line of LIN bus 4.

The ascertained values of transmitted signal Tx and received signal Rx are directed by data lines 30, via terminals 31, to the outside of measurement set-up 18, where they may be picked off in a simple matter for further processing.

What is claimed is:

1. A control unit for controlling and/or regulating at least one vehicle function, comprising:
    at least one computing element and one transceiver that connect the control unit to at least one data line of a client-server network, the at least one computing element configured to determine if the transceiver is transmitting or receiving data via the at least one data line of the client-server network using at least one transmitted signal and at least one received signal; and
    at least one measurement device, the control unit being connected to the at least one data line of the client-server network via the at least one measurement device, the measurement device including a detector configured to determine if a change in a state of a data signal applied to the at least one data line originates at the control unit or at the client-server network;
    wherein the measurement device includes two resistor elements connected in series, one of the resistor elements being connected to the transceiver of the control unit and the other resistor element being connected to the data line of the client-server network, a reference signal being applied between the two resistor elements, and wherein the detector further includes a measurement arrangement configured to measure a voltage drop across each of the resistor elements, and wherein the detector includes a comparator to compare the two measured voltage drops to each other, the detector determining if the change in the state of the data signal applied to the at least one data line originates at the control unit or at the rest of the client-server network based on a result of the comparison.

2. The control unit as recited in claim 1, wherein the at least one transmitted signal and the at least one received signal are not directed outwards to terminals of the control unit.

3. The control unit as recited in claim 1, wherein the client-server network includes exactly one data line.

4. The control unit as recited in claim 3, wherein the client-server network is a local interconnect network (LIN).

5. The control unit as recited in claim 1, wherein the computing element is a microcontroller.

6. The control unit as recited in claim 1, wherein the computing element is a finite-state machine.

7. The control unit as recited in claim 1, wherein the computing element and the transceiver are formed on a common, large-scale integrated semiconductor chip.

8. The control unit as recited in claim 1, wherein the measurement device includes a logic circuit configured to ascertain the at least one transmitted signal and the at least one received signal of the control unit on the basis of the information as to whether a change in the state of the data signal applied to the at least one data line originates at the control unit or at the client-server network based on the state of the data signal.

9. The control unit as recited in claim 1, wherein the reference signal is drawn from a battery voltage of a vehicle battery.

10. A client-server network, comprising:
    at least one data line; and
    at least one control unit for controlling and/or regulating at least one vehicle function connected to the at least one data line, at least one of the control units including at least one computing element and one transceiver, via which the at least one computing element is connected to the at least one data line, the at least one computing element configured to determine if the transceiver is transmitting or receiving data via the at least one data line of the client-server network using at least one transmitted signal and at least one received signal;

wherein the at least one of the control units of the client-server network is connected to the at least one data line of the client-server network via at least one measurement device, the measurement device including a detector configured to determine if a change in a state of a data signal applied to the at least one data line originates at the at least one control unit that is connected to the client-server network via the at least one measurement device, or at the rest of the client-server network;

wherein the measurement device includes two resistor elements connected in series, one of the resistor elements being connected to the transceiver of the control unit and the other resistor element being connected to the data line of the client-server network, a reference signal being applied between the two resistor elements, and wherein the detector further includes a measurement arrangement configured to measure a voltage drop across each of the resistor elements, and wherein the detector includes a comparator to compare the two measured voltage drops to each other, the detector determining if the change in the state of the data signal applied to the at least one data line originates at the control unit or at the rest of the client-server network based on a result of the comparison.

11. A measurement device connected to a data line of a client-server network, via which a control unit for controlling and/or regulating at least one vehicle function is connected to the client-server network, the measurement device including a detector configured to determine if a change in a state of a data signal applied to the data line originates at the control unit or at the rest of the client-server network, wherein the measurement device includes two resistor elements connected in series, one of the resistor elements being connected to a transceiver of the control unit and the other resistor element being connected to the data line of the client-server network, a reference signal being applied between the two resistor elements, and wherein the detector further includes a measurement arrangement configured to measure a voltage drop across each of the resistor elements, and wherein the detector includes a comparator to compare the two measured voltage drops to each other, the detector determining if the change in the state of the data signal applied to the at least one data line originates at the control unit or at the rest of the client-server network based on a result of the comparison.

* * * * *